United States Patent
Fritz et al.

(10) Patent No.: US 6,623,046 B1
(45) Date of Patent: Sep. 23, 2003

(54) TUBE WITH A CORRUGATED INNER SURFACE AND AN INSERTABLE COMPONENT

(75) Inventors: Thomas Fritz, Gernsbach (DE); Axel Schneider, Sinzheim (DE)

(73) Assignee: Aeroquip-Vickers International GmbH, Baden-Baden (DE)

( * ) Notice: Subject to any disclaimer, the term of this patent is extended or adjusted under 35 U.S.C. 154(b) by 0 days.

(21) Appl. No.: 10/009,628

(22) PCT Filed: May 2, 2000

(86) PCT No.: PCT/EP00/03918

§ 371 (c)(1),
(2), (4) Date: Mar. 1, 2002

(87) PCT Pub. No.: WO01/09544

PCT Pub. Date: Feb. 8, 2001

(30) Foreign Application Priority Data

Apr. 29, 1999 (DE) .......................................... 199 19 440

(51) Int. Cl.⁷ ................................................. F16L 33/00
(52) U.S. Cl. .................... 285/242; 285/222.1; 285/256; 285/903; 285/917
(58) Field of Search .............................. 285/242, 222.1, 285/256, 259, 903, 917

(56) References Cited

U.S. PATENT DOCUMENTS

| | | | | |
|---|---|---|---|---|
| 1,580,963 A | * | 4/1926 | Crandall | 285/259 |
| 2,371,971 A | * | 3/1945 | Main et al. | 285/259 |
| 3,262,718 A | * | 7/1966 | Draudt | 285/242 |
| 3,539,207 A | * | 11/1970 | Harris | 285/256 |
| 3,993,330 A | * | 11/1976 | Guransson | 285/151.1 |
| 4,006,922 A | * | 2/1977 | Bartholomew | 285/39 |
| 4,400,022 A | * | 8/1983 | Wright | 285/256 |
| 5,053,097 A | * | 10/1991 | Johansson et al. | 285/903 |
| 5,607,191 A | * | 3/1997 | Wilson | 285/256 |
| 5,868,435 A | * | 2/1999 | Bartolomew | 285/242 |
| 5,911,448 A | * | 6/1999 | Feher | 285/222.1 |

FOREIGN PATENT DOCUMENTS

| | | |
|---|---|---|
| DE | 296 18 633 U1 | 2/1997 |
| EP | 0 436 923 A2 | 12/1990 |
| EP | 0 791 154 B1 | 10/1998 |

* cited by examiner

Primary Examiner—Lynne H. Browne
Assistant Examiner—James M. Hewitt
(74) Attorney, Agent, or Firm—Emch, Schaffer, Schaub & Porcello Co., L.P.A.

(57) ABSTRACT

A hose for transporting preferably gaseous media at high temperatures and under high pressure has a corrugated interior surface with depressions and elevations, and at least one insertion element that can be inserted in one end. The hose is characterized in that, in the region of contact between the interior surface of the hose and the exterior surface of the insertion element, at least one gasket element of crystalline material is provided. The gasket element is metal, preferably a lead or copper alloy.

18 Claims, 1 Drawing Sheet

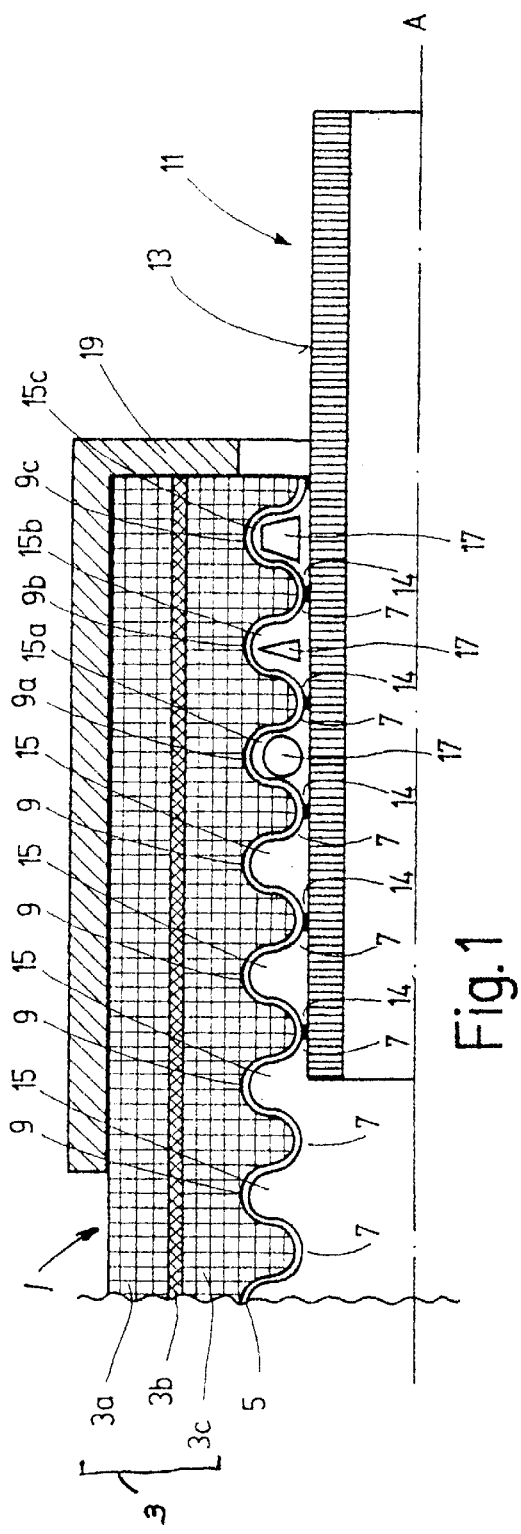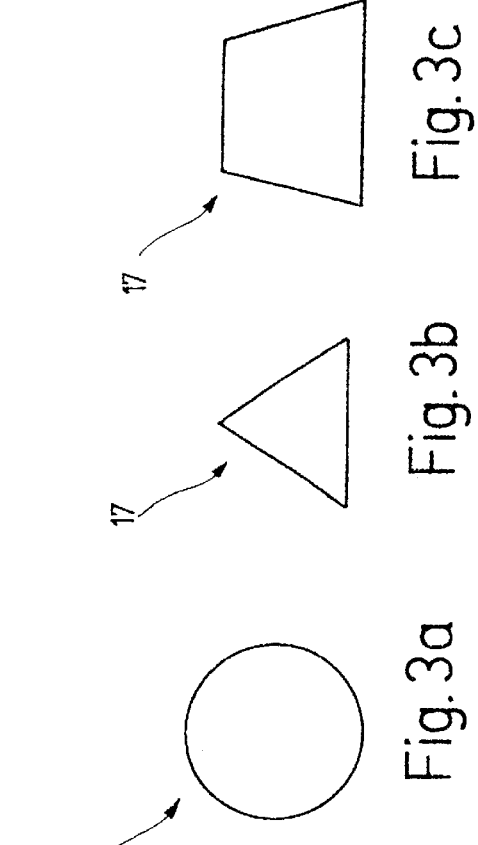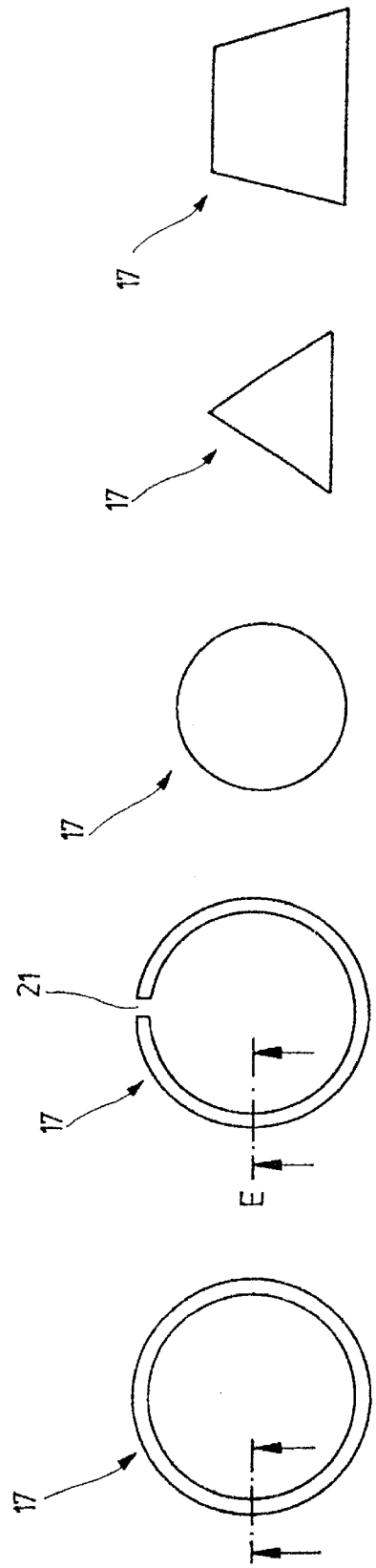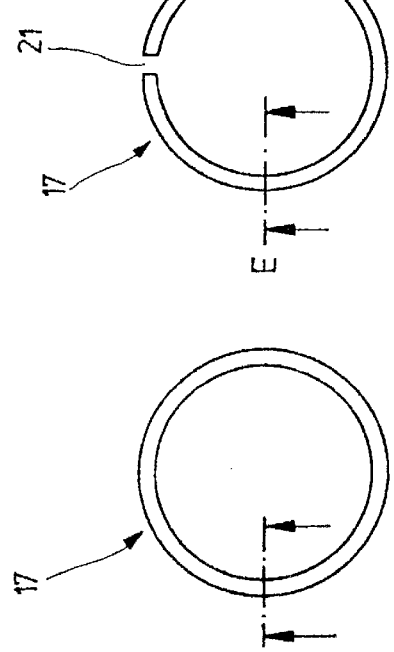

TUBE WITH A CORRUGATED INNER SURFACE AND AN INSERTABLE COMPONENT

SPECIFICATION

The invention herein relates to a hose in accordance with the preamble of claim 1.

BACKGROUND OF THE INVENTION

Hoses of the type addressed herein have been known. They are used to transport gaseous and fluid media in applications in the automobile industry, for example, where they are installed in air-conditioning systems and/or steering aid systems. They are produced "by the meter" by the manufacturer and cut to a desired length. The end regions of hoses manufactured in this manner must be prepared in such a manner that the hoses can be suitably integrated in a system for the transport of preferably gaseous media. To achieve this, at least one end is provided with an insertion element, also called a fitting, which is inserted in this end. The hoses addressed herein have a corrugated interior surface. Therefore, they have elevations and depressions in that region. It is necessary that the hose create a tight seal with the insertion element, so that media may be transported even at high pressure, without having the media to be transported leak out in the region of the insertion element. The insertion element which is inserted in at least one end of the hose projects beyond the end of the hose and may be tightly connected with a connecting site so that a seal is created. In so doing, it is possible to connect the hose with an appropriate element inside the arrangement which serves for the transport of the gaseous medium, as well as connect hose ends with each other.

It has been found that in different operating states it is not possible to create a lasting, tight seal between the insertion element and the associate hose end. In some cases the connection between hose and insertion element has even come apart.

SUMMARY OF THE INVENTION

Therefore, the problem to be solved by the invention herein is to provide a hose which permits a tight connection, creating a seal between the hose and the insertion element.

This problem has been solved by means of a hose, which exhibits the features disclosed by claim 1. The hose is characterized by at least one gasket element provided in the area of contact between the interior surface of the hose and the exterior surface of the insertion element, said gasket consisting of a crystalline, in particular metallic, material, preferably of a lead or copper alloy. In so doing, the gasket element prevents the medium transported through the hose from leaking out so that it cannot damage the area of contact between the interior surface of the hose and the exterior surface of the insertion element. Consequently, this ensures on one hand that the connection between hose and insertion element remains continuously tight and on the other hand that this connection will not come apart.

In the case of a preferred example of embodiment of the hose the material of the gasket element is softer than the material of the interior surface of the hose. Consequently, the gasket element, which, prior to insertion of the insertion element, is located in the depressions of the interior surface of the hose, is deformed in a plastic or elastic manner when the insertion element is inserted, thereby creating a force-closed connection due to adhesive friction between the gasket element and the interior surface of the hose and/or a form-closed connection due a notch or groove on the gasket element between the gasket element and the interior surface of the hose.

One of the features of a preferred form of embodiment of the hose is that the depression is created by a peripheral groove created on an imaginary helical line. This embodiment facilitates insertion of the gasket elements—which, in that case, are configured as open rings—into the inside of the hose. Therefore, the gasket elements used here follow the helical depression. Their length can be adapted to the individual situation that requires a seal. Furthermore, it is possible to use gasket elements which extend more than once around the exterior surface of the insertion element. In this instance, analogous to the ring-shaped gasket elements, it is possible to insert gasket elements in adjacent grooves or depressions.

In another preferred example of embodiment of the hose the gasket element has a circular or polygonal, preferably triangular or trapezoidal, cross-section. The circular cross-section of the gasket element provides a particularly large surface, which may come into force-closed engagement with the interior surface of the hose. The polygonal cross-section permits the abutment of the gasket element in an edge region of the interior surface of the hose or the exterior surface of the insertion element, so that particularly high compressive forces per unit area are developed, said forces permitting a safe seal even at high pressure.

Another preferred example of embodiment of the hose features an insertion element of stainless steel, plastic material, polyamide or the like. The choice of these materials has the advantage that they can be handled without problems and that, therefore, the insertion elements are easy to manufacture.

Additional preferred examples of embodiment are disclosed by the remaining Subclaims.

BRIEF DESCRIPTION OF THE DRAWINGS

Hereinafter, the invention will be explained with reference to drawings. They show:

FIG. 1 a longitudinal section through a first example of embodiment of a hose;

FIG. 2a a plan view of a first example of embodiment of a gasket element;

FIG. 2b a plan view of a second example of embodiment of a gasket element;

FIG. 3a a sectional view along plane E through one of the gasket elements in accordance with FIG. 1;

FIG. 3b a sectional view along plane E through another gasket element in accordance with FIG. 1; and FIG. 3c a sectional view along plane E through yet another gasket element in accordance with FIG. 1.

DETAILED DESCRIPTION OF THE INVENTION

FIG. 1 shows the upper half of a longitudinal section through a hose 1. Said hose has a hose jacket 3 consisting of several individual layers, that is, abutting individual layers 3a, 3b, 3c, arranged coaxially with respect to each other. Of course, the number of individual layers forming hose jacket 3 is not restricted to three; the three individual layers shown here only serve as an example. The interior side of the hose is corrugated; therefore, the interior surface 5 of hose 1 is provided with elevations 7 and depressions 9.

In the course of this Application elevations 7 are those sections of the interior surface 5 of hose 1 which extend the farthest toward the inside, i.e., those sections which are closest to a central axis A. Accordingly, depressions 9 are those sections of interior surface 5 of hose 1 which are at the greatest distance from central axis A. In accordance with FIG. 1, elevations 7 and depressions 9 form on the interior surface 5 of hose 1 a wave configuration, which is depicted here as being uniform, for example. Wave configuration of interior surface 5 of hose 1 may be restricted to the end regions of hose 1 as shown in FIG. 1, however, it may also be applied to the entire hose 1. The last mentioned modification is preferred because it is easier to manufacture and hence less expensive. Preferably, the wave configuration is implemented as a corrugated tube.

Furthermore, FIG. 1 shows an insertion element 11 inserted from the right into the end of hose 1. The inside diameter of said hose and the outside diameter of insertion element 11 are adapted to each other in such a manner that elevations 7, together with depressions 9 and one exterior surface 13 of insertion element 11, form chambers 15. These contain gasket elements 17. At contact sites 14, elevations 7 contact exterior surface 13 of insertion element 11. FIG. 1 shows that the geometric form of contact sites 14 is a function of the ratio of the outside diameter of insertion element 11 to the inside diameter of hose 1 and, in particular a function of the radius of curvature of elevations 7 in the area of contact sites 14.

The longitudinal section through hose 1 shows only the "upper half" of hose 1, i.e., this sectional view represents the example of embodiment in which depressions 9 are formed by peripheral annular grooves, as well as the example of embodiment in which depressions 9 are formed by one or more grooves on an imaginary helical line. In the former example the "lower half" of hose 1 results from a simple rotation of the "upper half" about central axis A, whereas in the latter example the "lower half" of hose 1 results from a rotation of the "upper half" about central axis A with a simultaneous longitudinal offset along central axis A.

Furthermore, FIG. 1 shows a sleeve 19 extending over the hose end. Said sleeve is used to fix insertion element 11 projecting from hose 1 to the end region of hose 1. Furthermore, said sleeve prevents the outermost individual layer 3a of hose 1 from fanning out, which would ultimately destroy the hose.

In the case shown here, hose 1 has three gasket elements 17 in chambers 15a, 15b, 15c associated with depressions 9a, 9b, 9c. For clarification, FIG. 1 shows gasket elements 17 in such a manner that they are not in intimate contact with elevations 7, depressions 9 of the interior surface 5 of hose 1 and exterior surfaces 13 of insertion element 11. In practice, gasket elements 17 in chambers 15 are of course, compressed or deformed. Likewise, the drawing of FIG. 1 does not show the notches or grooves resulting from hardness differences among the materials of gasket elements 17 and insertion element 11 on gasket element 17.

The end region of hose 1 may be provided with one or more gasket elements 17. If more than one is used, they have the same or different cross-sectional forms. For example, gasket element 17 in chamber 15 has a circular cross-section, gasket element 17 in chamber 15b has a triangular cross-section, while gasket element 17 in chamber 15c has a trapezoidal cross-section.

FIG. 1 shows gasket elements in three successive chambers. Regarding this, the following: The number of gasket elements used depends on the different operating situations. As a rule, however, it should be sufficient to accommodate one gasket element in a chamber 15 formed between insertion element 11 and interior surface 5 of hose 1. However, it is also conceivable, for example, if high internal pressure exists inside hose 1, to place a gasket element in more than one chamber and, if necessary, as illustrated here, in several—even several adjacent—chambers, whereby said gaskets may even have different cross-sectional configurations.

FIGS. 2a and 2b show plan views of gasket elements 17. The example of embodiment of gasket element 17 shown by FIG. 2a is used in that example of embodiment of hose 1 which has circular peripheral grooves as depressions 9, whereas the form of embodiment of gasket element 17 shown by FIG. 2b is used in conjunction with that example of embodiment of hose 1 which has as depression 9 one or more adjacent grooves following an imaginary helical line. In this example of embodiment gasket element 17 is provided with a slot 21 and optionally configured in spiral form so that the ends of gasket element 17 are not located on one plane. The length of the gasket element shown by FIG. 2b corresponds practically to the length of gasket element 17 as shown by FIG. 2a. However, at low internal pressure inside hose 1 it is possible to provide relatively short gasket elements in the helical groove, i.e., depression 9, and thus ensure a safe seal of the hose interior. Conversely, if the pressure inside hose 1 is high, it is possible to use gasket elements having a length that is considerably greater than that of the circular gasket element shown by FIG. 2a. For example, it is conceivable that gasket element 17 in accordance with FIG. 2b extends over several convolutions of the imaginary helical line and, in so doing, ensures a particularly large sealing area.

FIGS. 3a, 3b and 3c show sectional views along plane E of gasket elements shown in FIG. 2a and 2b. In so doing, FIG. 3a shows a gasket element 17 with circular cross-section, FIG. 3b a gasket element 17 with triangular cross-section, and FIG. 3c a gasket element 17 with trapezoidal cross-section. Of course, other cross-sections are also conceivable.

A gasket element 17 having circular cross-section in accordance with FIG. 3a is characterized by a particularly large abutment area on the exterior surface of insertion element 11, as well as on the interior surface 5 of hose 1. If the outside diameter of gasket element 17 corresponds essentially to the width of depression 9, and in particular to twice the radius of curvature of the bottom of depression 9, particularly large areas of abutment are created and hence large sealing areas.

Furthermore, FIG. 3 shows gasket elements having polygonal cross-sections. A first gasket element has a triangular cross-section and a second one a trapezoidal cross-section. Considering this embodiment, it is conceivable that one or more edges of the gasket element come into engagement with the interior surface of hose 1 and the exterior surface of insertion element 11 in such a manner that notches and grooves are formed so that in this case also an optimal seal is ensured.

Due to the fact that gasket elements 17 consist of crystalline, in particular metallic, material, high chemical resistance is achieved with respect to media transported inside the hose. Furthermore, it is possible to use gasket elements 17 at very high temperatures and pressures. Gasket elements 17 fabricated of a lead or copper alloy have been found to be particularly resistant.

Furthermore, it has been found that the connection between hose end and insertion element as described herein exhibits particularly good operational safety. This means, that even at high internal pressure a tight connection between the interior surface of the hose and the exterior surface of the insertion element is achieved. This is accomplished by the gasket elements described herein that consist of a crystalline material and therefore are particularly dimensionally stable. Furthermore, they are not displaced from their sealing position by high internal hose pressure or even pushed out, or so-to-speak extruded out of their associate depressions. However, the gasket elements not only withstand great pressure but also are resistant to media inside the hose, as well as their temperatures.

Therefore, the gasket elements can ensure a tight and safe seal between hose and insertion element in a large field of applications.

It has been found to be particularly useful to install gasket elements of a lead alloy or even of a copper/plasticine alloy which exhibits an elongation at break in a range of 0% to 60%, i.e., is distinguished by an elongation limit in the range of from 10 to 500 N/MM². The elasticity modulus of this alloy is in the range of 90 to $120 \cdot 10^3$ N/mm². The copper/plasticine alloy consists of copper and alloy components accounting for a maximum of 50% of the alloy. The preferably used alloy component is zinc and/or tin. The gasket element preferably consists of a copper/zinc alloy ($CuZn_3$, identified by Material Number 2.0265).

The innermost layer 3c of hose 1 may be provided with an interior metal coating. Furthermore, it is possible to insert here a so-called corrugated tube, whereby individual layer 3c is placed on or firmly attached to the outside of said tube.

The metal coating or the metal tube may preferably consists of stainless steel having Material Number 1.451, 1.4404 or 1.4571. The material used here is distinguished by its alloy having a high content of chromium and also nickel. The elongation limit of the material is in the range of 100 to 500 N/mm² and its elongation at break is in the range of from 0% to over 500%. The elasticity modulus is in the range of 190 to $220 \cdot 10^3$ N/mm².

As regards insertion element 11, preferably a free-cutting steel having Material Number 1.0718 or a stainless steel having Material Number 1.4541, 1.4571 or 1.4301 is used. The elongation limit of the material should be within the range of from 50 to above 500 N/mm² and the elongation at break should be in a range of from 0% to over 50%. The elasticity modulus should be within the range of from 190 to $220 \cdot 10^3$ N/mm².

Furthermore, it is essential that sleeve 19 exert a force on the hose end such that gasket element 17 is clamped between hose interior surface 5 or between the two metal coatings of individual layer 3c, or the corrugated tube and insertion element 11 in such a manner that an elastic or plastic deformation of the gasket element takes place and the desired seal is achieved. The sealing effect is enhanced in that suitable materials for the gasket element, the metal coating, or the corrugated tube and the insertion element are combined with each other. In so doing, it is particularly advantageous when the material used for the gasket element can be deformed easily and is deformed when the sleeve is mounted to the hose between the hose and the insertion element in such a manner that this deformation results in a force-closed or form-closed connection, thereby enhancing the sealing effect.

What is claimed is:

1. A hose assembly for transporting fluid under high pressure, comprising (a) a hose having an end, (b) at least one insertion element (11) having a non-grooved exterior surface positioned in said end and (c) a sleeve encircling said hose at said end, said hose having a non-corrugated exterior surface adapted to receive a force there around imparted by said sleeve and an interior surface (5) which prior to engagement by said insertion element, is provided with a series of depressions (9) and elevations (7), characterized in that, at least one gasket element (17) is positioned in said depressions throughout the area of contact between said hose interior surface (5) and said insertion element exterior surface (13), said gasket element (17) being a crystalline material and deformable upon engagement of said insertion element and said sleeve with said hose and to effect sealing engagement with said hose interior surface and said insertion element exterior surface.

2. A hose assembly in accordance with claim 1, wherein said crystalline material is metal.

3. A hose assembly in accordance with claim 1, wherein said crystalline material is a lead alloy or copper alloy.

4. A hose assembly in accordance with claim 1, characterized in that the material of said gasket element (17) is softer than the material of the interior surface (5) of the hose (1).

5. A hose assembly in accordance with claim 1, characterized in that said depressions (9) are configured as circular, peripheral grooves.

6. A hose assembly in accordance with claim 1, characterized in that said gasket element (17) is configured as a closed ring.

7. A hose assembly in accordance with claim 1, characterized in that there is provided one depression (9) which is configured as a helical groove.

8. A hose assembly in accordance with claim 7, characterized in that said gasket element (17) has a helical shape.

9. A hose assembly in accordance with claim 1, characterized in that there is provided a plurality of annular depressions (9).

10. A hose assembly in accordance with claim 1, characterized in that said gasket element (17) has a circular or polygonal cross-section.

11. A hose assembly in accordance with claim 1, characterized in that a force-closed connection is provided between said gasket element (17) and said hose (1).

12. A hose assembly in accordance with claim 1, characterized in that a force-closed connection is provided between said gasket element (17) and said insertion element (11).

13. A hose assembly in accordance with claim 1, characterized in that the insertion element (11) is a member selected from the group consisting of stainless steel, plastic material, or polyamide.

14. A hose assembly in accordance with claim 1, characterized in that said gasket element is a copper/plasticine alloy or a copper/zinc alloy.

15. A hose assembly according to claim 14, wherein said alloy has an elongation limit in the range of from 10 to 500 N/mm² or an elasticity modulus in the range of from 90 to $120 \cdot 10^3$ N/mm².

16. A hose assembly in accordance with claim 1, characterized in that said interior surface is provided with a metal coating.

17. A hose assembly in accordance with claim 16, characterized in that said metal coating uses a stainless steel having an elongation limit in the range of from 100 to 500 N/mm² or an elasticity modulus in the range of from 190 to $220 \cdot 10^3$ N/mm².

18. A hose assembly in accordance with claim 1, characterized in that said insertion element is a free-cutting steel or a stainless steel having an elongation limit in the range of from 50 to 500 N/mm² or an elasticity modulus in the range of from 190 to $220 \cdot 10^3$ N/mm².

* * * * *